US012662051B2

(12) United States Patent
Baker

(10) Patent No.: US 12,662,051 B2
(45) Date of Patent: Jun. 23, 2026

(54) AUTOMATIC TRAILER HITCH

(71) Applicant: Gregory Robert Baker, Hazard, KY (US)

(72) Inventor: Gregory Robert Baker, Hazard, KY (US)

( * ) Notice: Subject to any disclaimer, the term of this patent is extended or adjusted under 35 U.S.C. 154(b) by 381 days.

(21) Appl. No.: 18/426,720

(22) Filed: Jan. 30, 2024

(65) Prior Publication Data

US 2024/0166003 A1 May 23, 2024

(51) Int. Cl.
| | |
|---|---|
| *B60D 1/26* | (2006.01) |
| *B60D 1/07* | (2006.01) |
| *B60D 1/46* | (2006.01) |
| *B60D 1/54* | (2006.01) |
| *B60R 1/00* | (2022.01) |

(52) U.S. Cl.
CPC ................. *B60D 1/26* (2013.01); *B60D 1/07* (2013.01); *B60D 1/465* (2013.01); *B60D 1/54* (2013.01); *B60R 1/003* (2013.01)

(58) Field of Classification Search
CPC ........... B60D 1/246; B60D 1/465; B60D 1/54
See application file for complete search history.

(56) References Cited

U.S. PATENT DOCUMENTS

| | | | | |
|---|---|---|---|---|
| 7,029,022 B2 * | 4/2006 | Moss | ........................ | B60D 1/54 |
| | | | | 280/490.1 |
| 8,408,577 B2 * | 4/2013 | Works | ...................... | B60D 1/46 |
| | | | | 280/491.1 |
| 12,479,246 B2 * | 11/2025 | Tang | ........................ | B60D 1/06 |
| 2017/0136836 A1 * | 5/2017 | Davis | ........................ | B60D 1/30 |

* cited by examiner

*Primary Examiner* — Minnah L Seoh
*Assistant Examiner* — Hosam Shabara
(74) *Attorney, Agent, or Firm* — Trevor T. Graves; Stites & Harbison PLLC

(57) ABSTRACT

Presented is an automatic trailer hitch for enabling removable coupling between a towing vehicle and a towed vehicle. The automatic trailer hitch includes a base module, a vertical climbing module, linchpin modules configured for selectively driving the linchpins in an engaged position and a disengaged position, and a rotation module. The vertical climbing module is configured to vertically displace a hitch along a single axis. The plurality of linchpin modules is configured for selectively driving the linchpins in an engaged position and a disengaged position. A controller module is operatively coupled to each of the vertical climbing module, the linchpin modules, and the rotation module to monitor and control the multiple-axis position adjustment of the hitch(s) of the automatic trailer hitch.

21 Claims, 18 Drawing Sheets

450

AUTOMATIC TRAILER HITCH

TECHNICAL FIELD

The present invention generally relates to the trailer hitches. More particularly, the present invention relates to an automatic trailer hitch that enables coupling a towed vehicle to a towing vehicle in multiple adjustable positions with a positive offset from the rear axle of the towing vehicle.

BACKGROUND

The ancient civilizations used carts and wagons for transporting goods and heavy loads to gain a significant mechanical advantage. Since the advent of the automotive industry used the same primitive predecessors to design modern trailers in the 19th and 20th centuries, there have been multiple evolutions to its design, versatility of use, and coupling methods.

Generally, trailer hitches also referred to as "tow bar" or "tow hitch" are attached to the chassis of a towing vehicle for towing a towing vehicle that may include but are not limited to trailer and so on. A common type of trailer hitch utilizes a tow ball to allow swiveling and articulation of a towed vehicle (i.e. trailer) relative to the towing vehicle. To tow safely, the correct combination of towed vehicle and trailer must be combined with correct loading horizontally and vertically on the tow ball.

Multiple ball adjustable trailer hitches already exist in the market and they offer various advantages. Multiple ball adjustable trailer hitch allows a user to adjust the hitch to accommodate many different towing applications instead of purchasing multiple hitches for every type of trailer or vehicle. The most common variable while towing multiple trailers is the height of the connection point between the truck and trailer. An adjustable hitch makes it possible to move the tow ball up and down rather than being limited to one position.

For instance, a trailer hitch is sold by B&W Trailer Hitches and is commercially available on the website Amazon using the product name B&W Trailer Hitches Tow & Stow Adjustable Trailer Hitch Ball Mount—Fits 2" Receiver, Tri-Ball (1⅞"×2"×2⁵⁄₁₆"), 5" Drop, 10,000 GTW-TS10048B: Automotive. The Tow and stow Adjustable Ball Mount Trailer Hitch is adjustable in height for level towing. The user can simply pull the two stainless steel adjustment pins to raise or lower the hitch to the ideal position for their vehicle and trailer combination. The user can easily rotate the ball assembly to swap between ball sizes. Further, the user can stow the hitch under their vehicle when the vehicle is not towing to avoid striking the shin of the user or the garage door.

However, the aforementioned trailer hitch sold by B&W Trailer Hitches has a few disadvantages. The B&W Trailer Hitch is manually adjustable. The user has to manually insert/extract linchpins (2 linchpins for vertical adjustment and 1 linchpin for ball adjustment) by the choice of the user to mark the end/start of coupling adjustment. Thus, the user needs to go outside the vehicle and manually connect the trailer with the towing vehicle using linchpins which is not always possible due to various factors such as but not limited to: rain, cold weather, hot weather, rough terrain, hazardous conditions and so on. Further, there is a possibility that the user can sometimes forget to insert linchpins and/or misplace (accidentally lose) linchpins rendering the coupling inefficient and/or uncomfortable for the user. Thus, the B&W Trailer Hitch fails to provide multiple options to its user for hauling multiple wagonloads with an enhanced capacity of towing translated through the coupler while providing flexibility and ease of use across multiple terrains and environmental challenges. Further, the B&W Trailer Hitch requires manual labor work in adjustment, linkage, and reversing the towing vehicle rendering it inefficient and/or uncomfortable for the user.

U.S. Pat. No. 7,029,022B2 discloses an apparatus for mounting a hitch to a vehicle. The apparatus may include a base connected to the vehicle. A mount, having a fastening portion and a main portion, may also be included. The fastening portion may receive a plurality of hitches thereon. The main portion may pivotably engage the base to provide a pivoting motion of the mount with respect to the base between a stowed position and a towing position distinct from the stowed position. A pivot may connect the main portion to the fastening portion to provide rotation therebetween. The apparatus may also include a hitch system having a first ball hitch monolithically formed to have a shank. A second hitch may be monolithically formed to have an aperture therein. The aperture of the second ball hitch may be shaped to axially receive and engage the shank of the first ball hitch.

The existing solutions related to tow ball adjustable trailer hitches are ineffective and inefficient, have some design flaws, and require manual work. Thus, there remains a need for an effective and efficient automatic trailer hitch that is capable of solving the aforementioned problems of the existing solutions. The automatic trailer hitch provides a modern, automatic approach for coupling a towed vehicle to a towing vehicle with a positive offset from the rear axle. The automatic trailer hitch provides multiple options to its users for hauling multiple towing vehicles with an enhanced capacity of towing by using a coupler while providing flexibility and ease of use across multiple terrains and environmental challenges. The automatic trailer hitch further provides the convenience of reduced labor in adjustment, linkage, and reversing the towing vehicle through guided assistance, automated actuation, and remote control with an electronic interface.

SUMMARY

Before the present systems and methods, and embodiments are described, it is to be understood that this application is not limited to the particular systems, and methodologies described, as there can be multiple possible embodiments that are not expressly illustrated in the present disclosures. It is also to be understood that the terminology used in the description is to describe the particular versions or embodiments only, and is not intended to limit the scope of the present application. Further, it is also to be understood that the terminology if not defined by the present disclosure should be construed as the general or known meaning/definition of the terminology, known to the person skilled in the art.

Embodiments of the present invention disclose an automatic trailer hitch for enabling removable coupling between a towing vehicle and a towed vehicle, wherein the automatic trailer hitch comprises: a base module comprising a block configured to be connected to a hitch receiver; wherein the block comprises a plurality of adjustment holes; wherein the base module further comprises a carriage connected to the L-shaped block, wherein the carriage comprises a plurality of gear tooth; a vertical climbing module comprising a track, a motor, a mechanical linkage, at least one input gear and at least one output gear; a plurality of linchpin modules configured for selectively driving the linchpins in an engaged position and a disengaged position; a rotation module comprising of a rotation motor, a retainer gear coupled to a rotation motor shaft, and an output gear coupled with a shaft, and at least one hitch connected to the shaft; wherein the rotation module is configured to rotate the hitch(s) along a single axis; and wherein each of the vertical climbing module, the plurality of linchpin modules and the rotation module comprises a motion sensing mechanism; a controller module configured to receive the user input using a user interface; wherein the controller module is operatively coupled to the motion sensing mechanism of each of the vertical climbing module, the plurality of linchpin modules and the rotation module to monitor and control the multiple-axis position adjustment of the hitch(s) of the automatic trailer hitch.

In another embodiment, the block is substantially L-shaped.

In another embodiment, the hitch receiver is connected to at least one of: a towing vehicle and/or a towed vehicle.

In another embodiment, the carriage is substantially U-shaped.

In another embodiment, the motion sensing mechanism includes an optical rotary encoder that is configured to sense the movement of the output gear and/or the input gear.

In another embodiment, the vertical climbing module is configured to vertically adjust the hitch(s) along a single axis.

In another embodiment, the vertical climbing module further comprises a plurality of bearings and screws.

In another embodiment, the motor includes at least one of: a servomotor and/or a stepper motor In another embodiment, the motor further comprises a potentiometer that is configured to act as a motion-sensing mechanism of the vertical climbing module.

In another embodiment, the mechanical linkage includes at least one of: chain and sprocket linkage, gear linkage, rope and pulley linkage, and belt and pulley linkage.

In another embodiment, the linchpin module comprises a brace plate and a nut plate actuated by a rotating lead screw and a driving motor.

In another embodiment, the motion-sensing mechanism of the linchpin module comprises a plurality of terminal roller-actuated micro-switches.

In another embodiment, the rotation motor includes at least one of: a servomotor and/or a stepper motor.

In another embodiment, the rotation motor further comprises a potentiometer that is configured to act as a motion-sensing mechanism of the rotation module.

In another embodiment, the hitch(s) is selected from group comprising of: ball hitch, pintle hitch, gooseneck hitch, boom hitch, receiver hitch, hook type hitch, lunette ring hitch and janney couplers.

In another embodiment, the user interface of the controller module includes at least one of touchscreen interface, joystick interface, remote, keyboard interface, switch interface and button interface.

In another embodiment, the controller module further comprises a camera to visually assist the user in enabling coupling between a towing vehicle and a towed vehicle.

In another embodiment, the controller module comprises a plurality of adjustable visor clips to enable the connection between the user interface and the installation surface of the controller module.

In another embodiment, the controller module further comprises a communication bus configured for data transfer between the controller module and the sensing mechanism of each of the vertical climbing modules, the plurality of linchpin modules, and the rotation module, wherein the communication bus transmits data through a communication interface comprising at least one of the: wired data cable connection, Bluetooth, internet, wireless local-area network (WLAN), and radio communication.

In another embodiment, the controller module further comprises a microprocessor having a memory that is capable of storing data in case of sudden power loss and retrieves data on restart.

In an another embodiment, the controller module is configured to selectively position the hitch(s) of the automatic trailer hitch in a deployed position and a stowed position; wherein in the deployed position, the automatic trailer hitch is positioned to allow removable coupling between a towing vehicle and a towed vehicle; and wherein in the stowed position, the automatic trailer hitch is positioned to not allow removable coupling between a towing vehicle and a towed vehicle to prevent damage and theft of the hitch(s) while ensuring ease of use in accessing the trunk of the towing vehicle.

It is an object of the present invention to provide an automatic trailer hitch that allows vertical height adjustment of the tow ball hitch for multiple types of trailers within the towing capacity of 10,000 lbs and above.

It is an object of the present invention to provide an automatic trailer hitch that allows the adjustment of three ball hitches in a tri-ball system by the choice of the user.

It is an object of the present invention to provide an automatic trailer hitch that conveniently stows the ball hitch to prevent damage and theft while ensuring ease of use in accessing the towing vehicle trunk.

It is an object of the present invention to provide a smooth user interface for the automatic trailer hitch using a controller module capable of controlling and monitoring the various states of coupling between the towing vehicle and the towed vehicle (trailer) using a real-time camera feed.

It is an object of the present invention to provide a self-adjusting automatic trailer hitch that uses motorized movements across three axes to align correctly with the desired trailer tongue. The self-adjusting automatic trailer hitch reduces the mechanical workload on the user while stowing away from view after use, thus protecting itself from any potential theft.

It is an object of the present invention to provide an automatic trailer hitch capable of adjusting the ball orientation by the choice of the user using motors and not involving manual fitting. The automatic trailer hitch can be vertically adjusted and stowed away from view after use.

DETAILED DESCRIPTION

Figure 1:
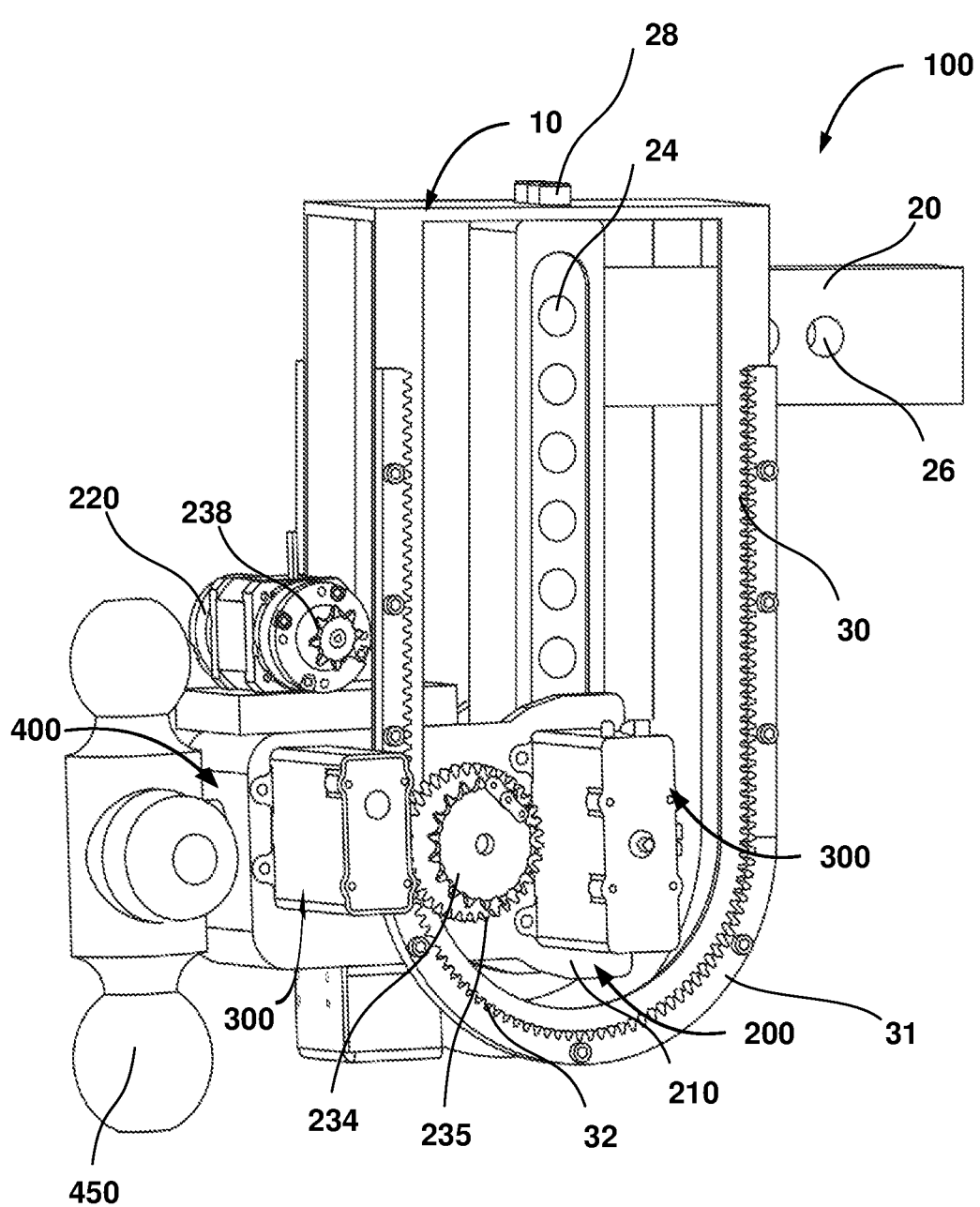
FIG. 1 illustrates a first-perspective view of an automatic trailer hitch in a deployed position, according to an embodiment of the present invention.
Figure 2:
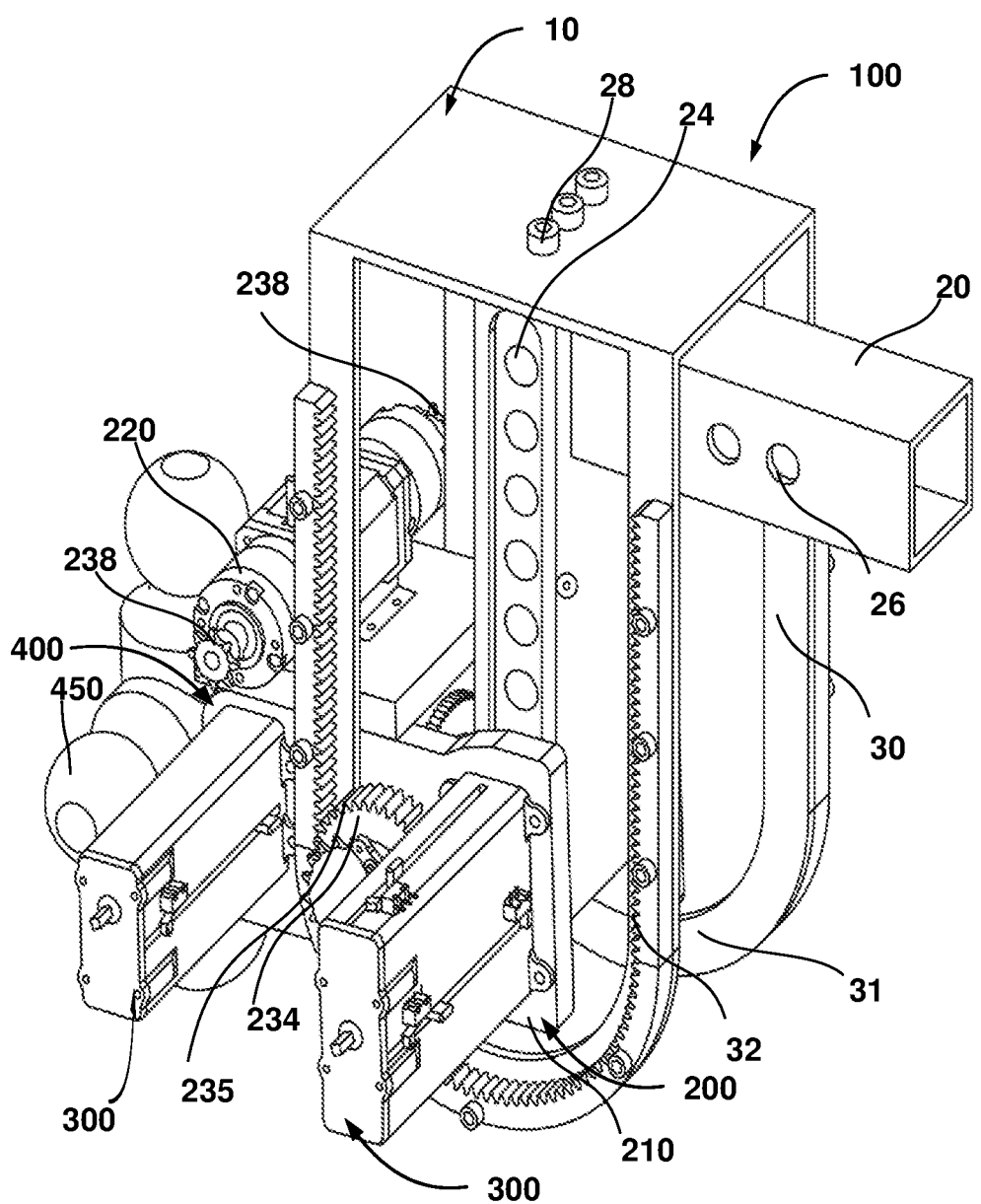
FIG. 2 illustrates a second perspective view of the automatic trailer hitch of FIG. 1 in a deployed position.
Figure 3:
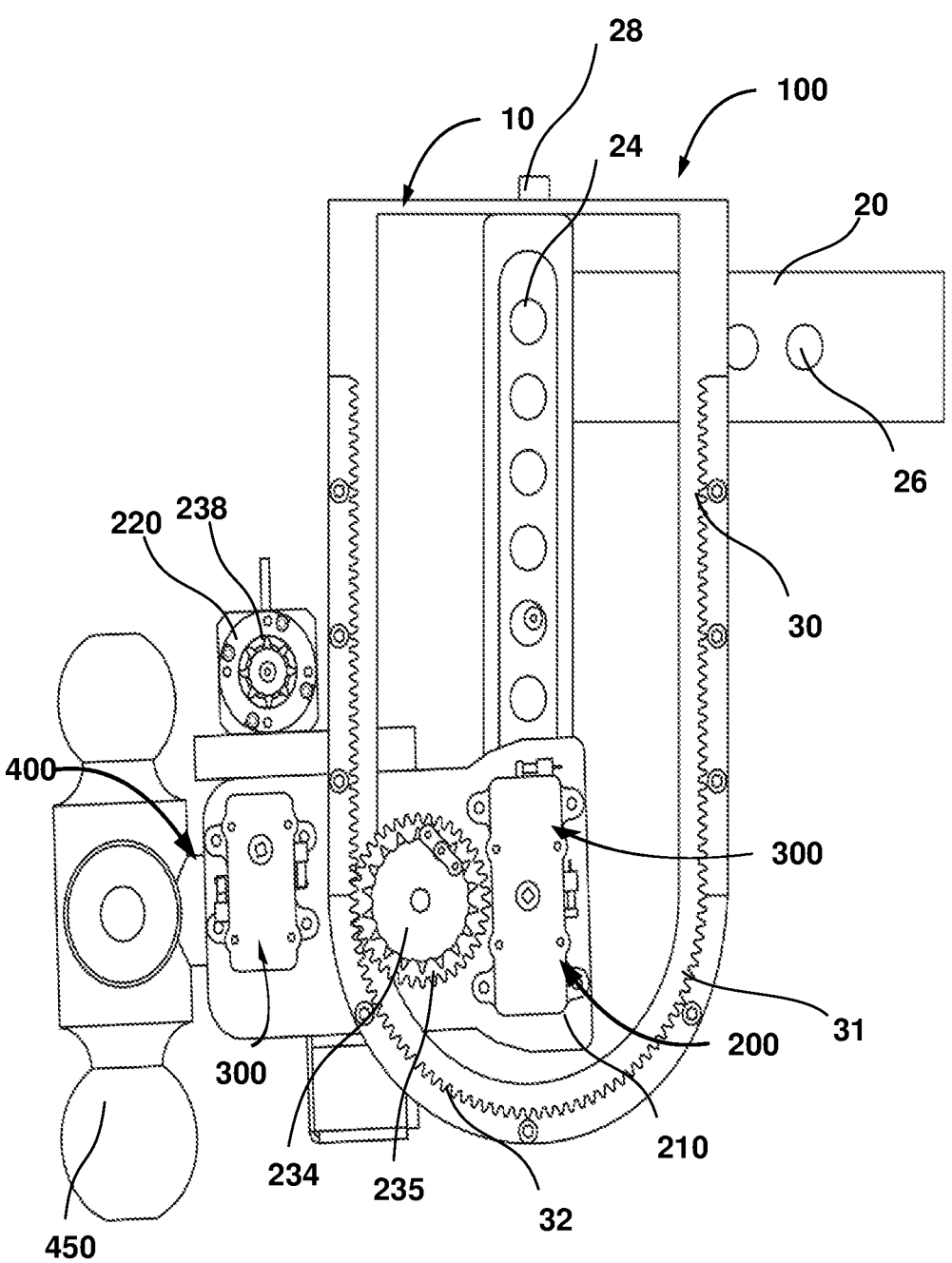
FIG. 3 illustrates a front view of the automatic trailer hitch of FIG. 1 in a deployed position.
Figure 4:
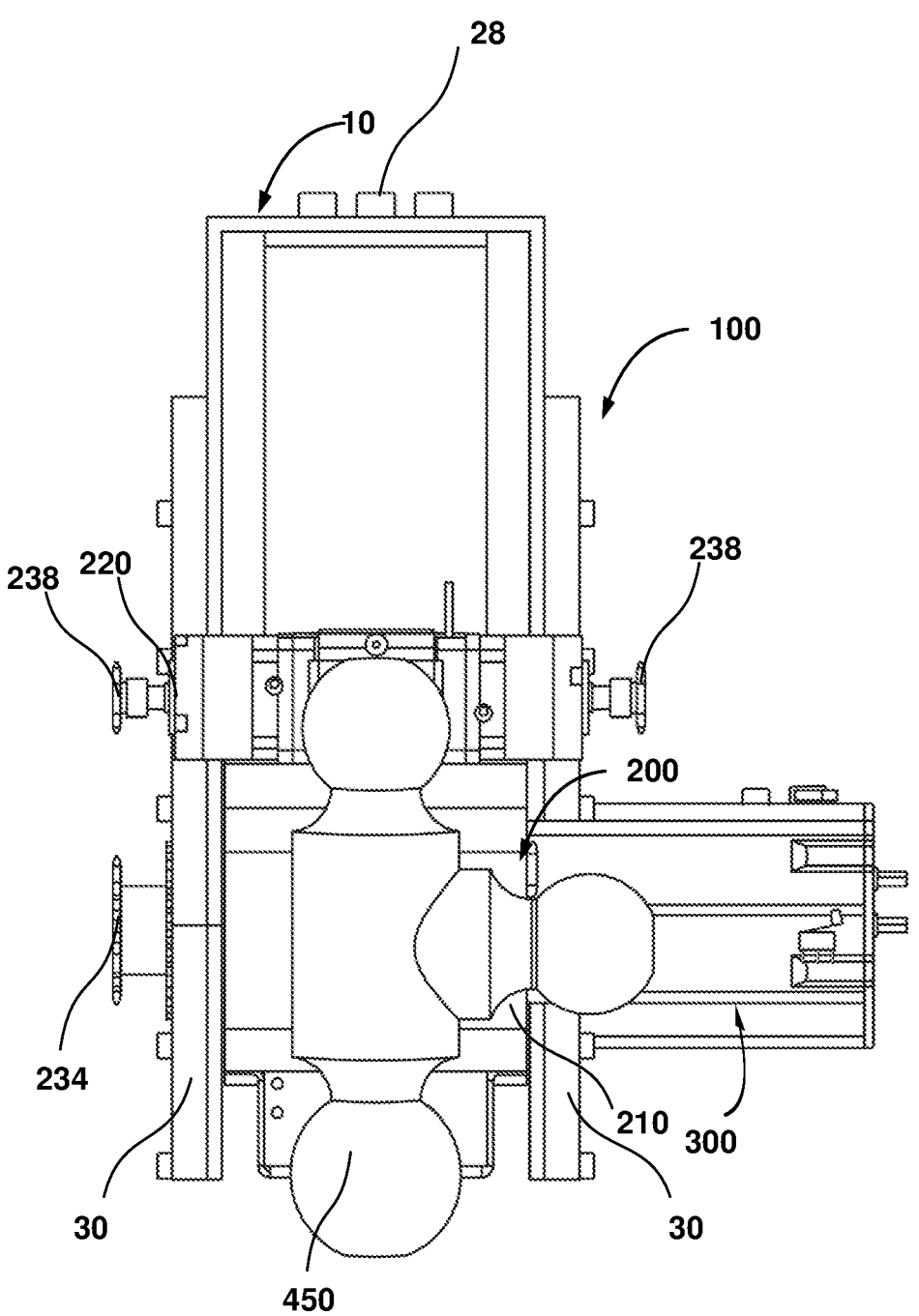
FIG. 4 illustrates a left-hand side view of the automatic trailer hitch of FIG. 1 in a deployed position.
Figure 5:
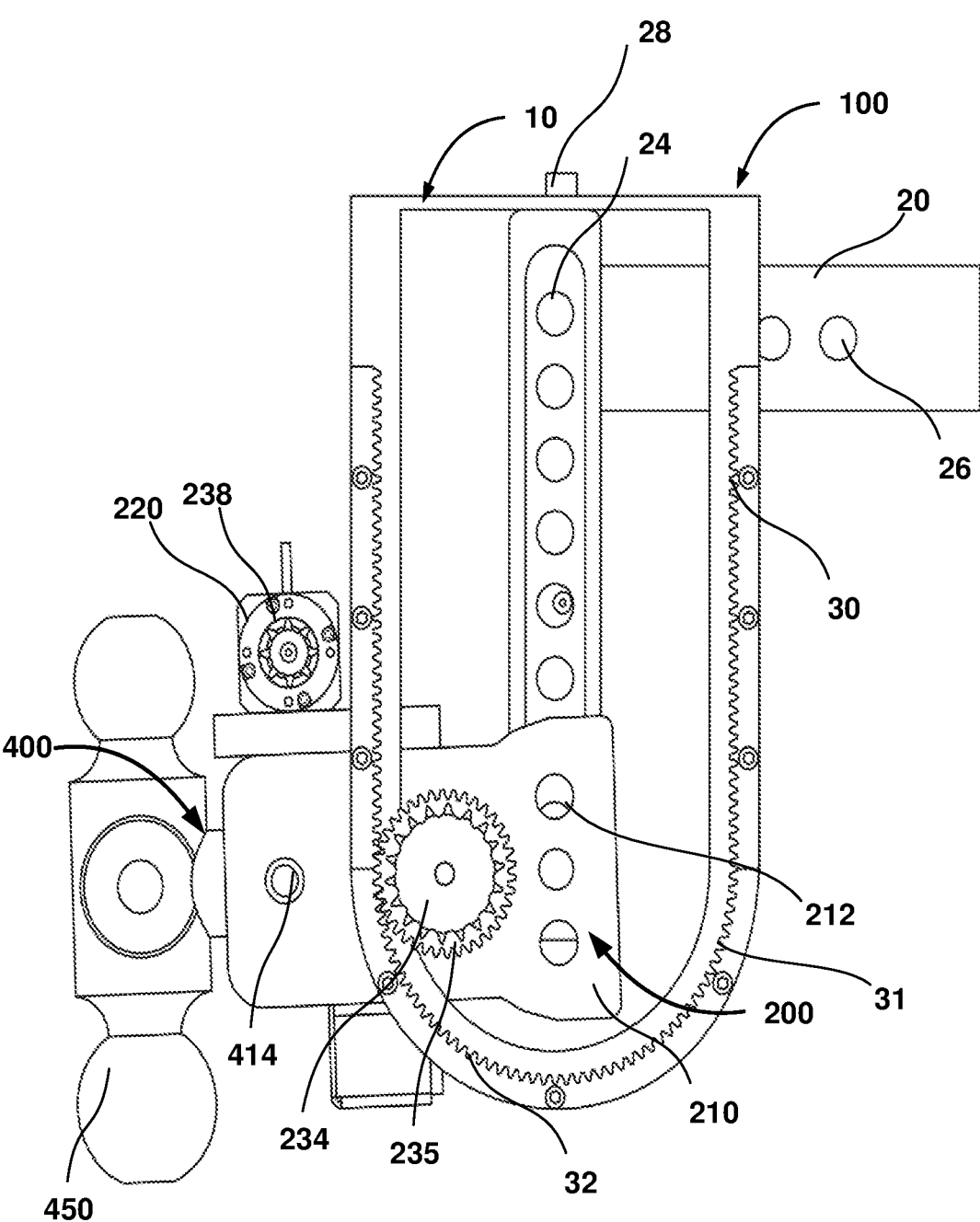
FIG. 5 illustrates a back view of the automatic trailer hitch of FIG. 1 in a deployed position.
Figure 6:
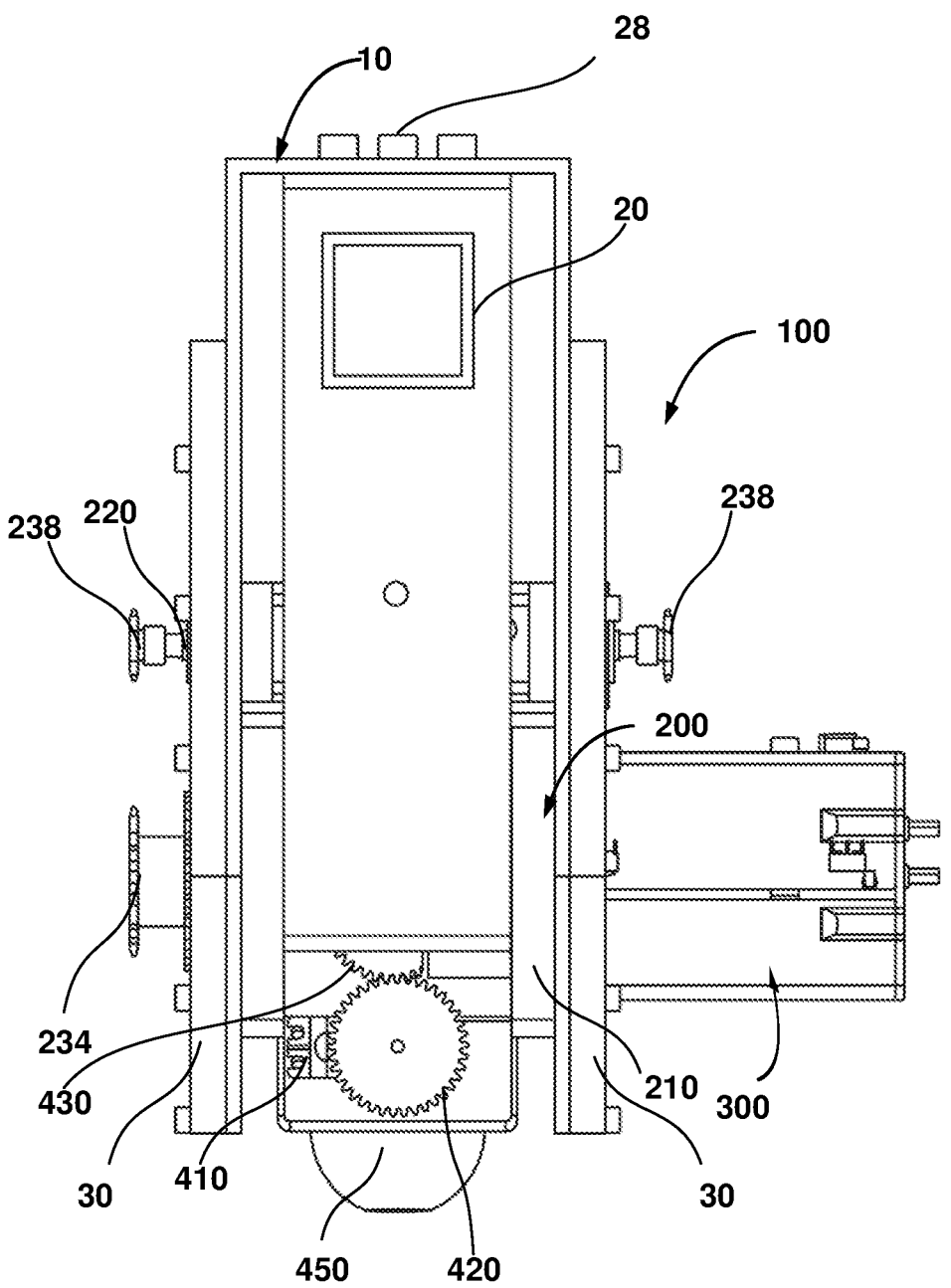
FIG. 6 illustrates a right-hand side view of the automatic trailer hitch of FIG. 1 in a deployed position.
Figure 7:
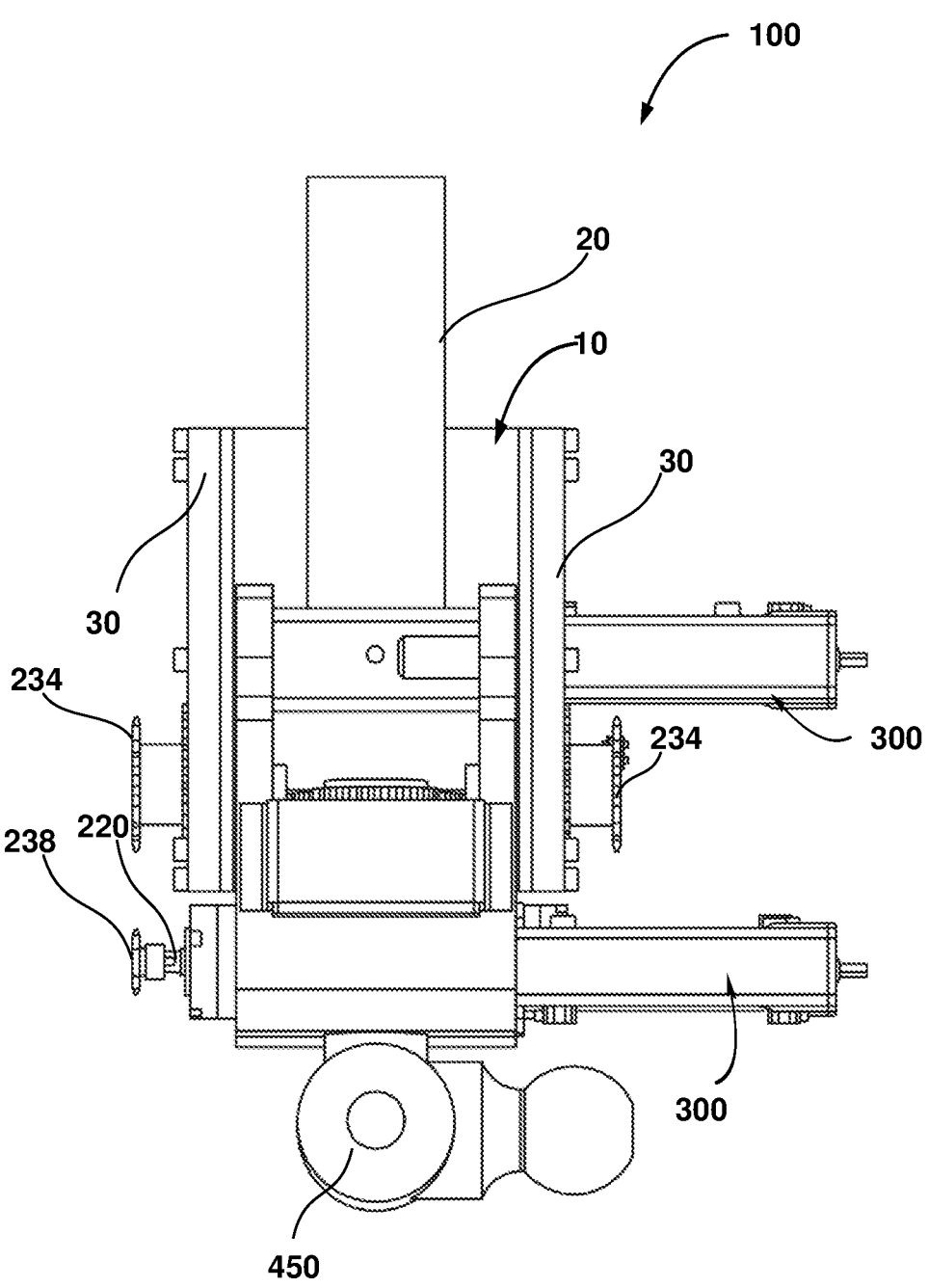
FIG. 7 illustrates a bottom view of the automatic trailer hitch of FIG. 1 in a deployed position.
Figure 8:
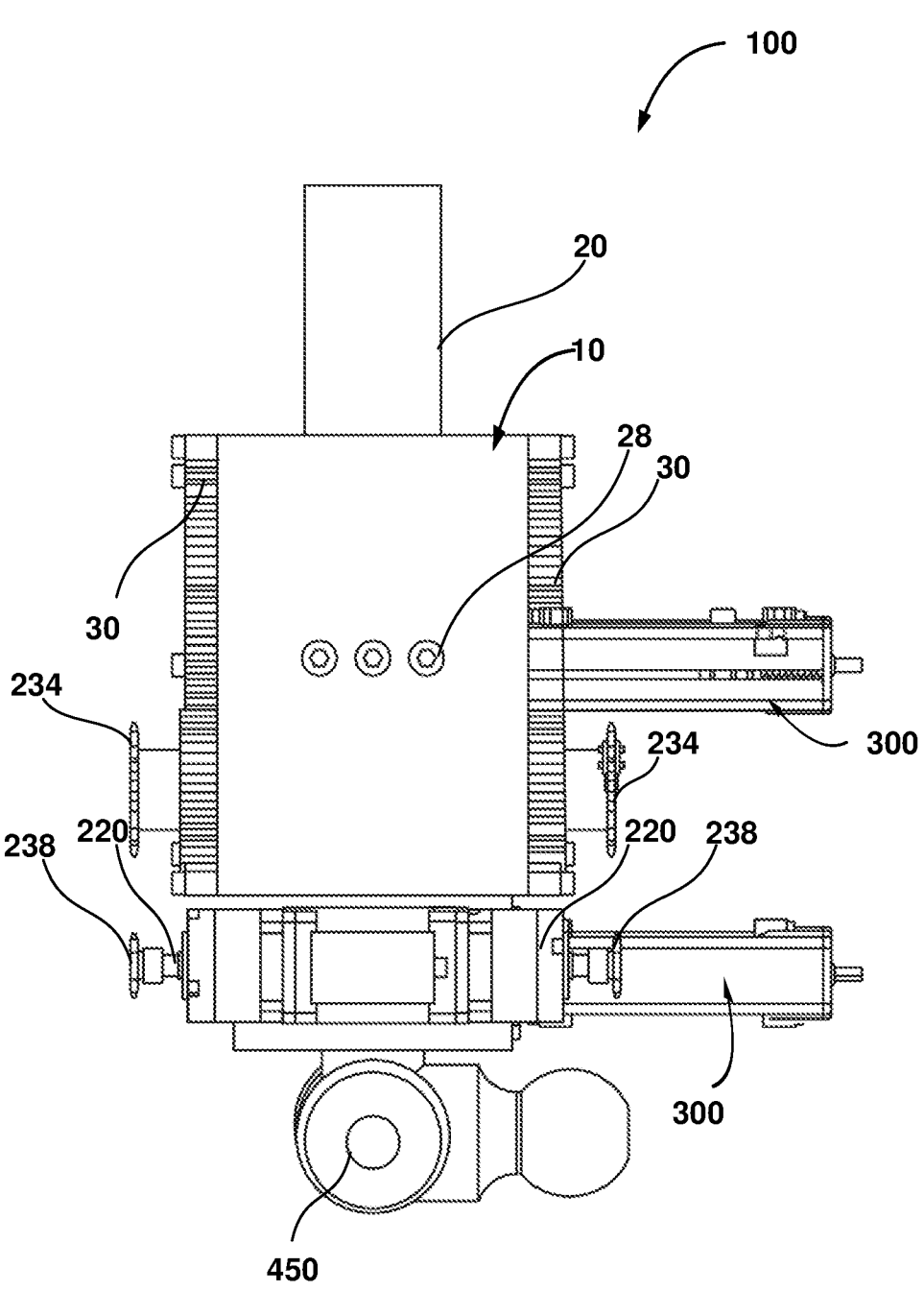
FIG. 8 illustrates a top view of the automatic trailer hitch of FIG. 1 in a deployed position.

Before describing the present invention in detail, it should be observed that the present invention utilizes a combination of components or processes, which constitutes an automatic trailer hitch. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component-level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Some embodiments, illustrating its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context dictates otherwise. Although any methods, and systems similar or equivalent to those described herein can be used in the practice or testing of embodiments, the preferred methods, and systems are now described. The disclosed embodiments are merely exemplary.

References to "one embodiment", "an embodiment", "another embodiment", "one example", "an example", "another example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open-ended in that an item or items following any one of these words is not meant to be an exhaustive listing of such item or items or meant to be limited to only the listed item or items.

The automatic trailer hitch will now be described with reference to the accompanying drawings, particularly FIGS. 1-18.

FIGS. 1-8 illustrates various views of the automatic trailer hitch 100 in a deployed position, according to an embodiment of the present invention. The automatic trailer hitch 100 is configured to enable removable coupling between a towing vehicle (not shown in figures) and a towed vehicle (not shown in figures). The towing vehicle (not shown in figures) could include any vehicle having sufficient drawing power to pull another vehicle and the towing vehicle (not shown in figures) could include but not limited to: truck, tractor, car, jeep, van, and so on. The towed vehicle (not shown in figures) could include any vehicle capable of being pulled by another vehicle and the towed vehicle (not shown in figures) could include but not limited to: trailer, cart, truck, tractor, camper, car, van and so on. The automatic trailer hitch 100 comprises a base module 10, a vertical climbing module 200, a plurality of linchpin modules 300, a rotation module 400, and a controller module 500, the entirety of which will be described in greater detail in the below description.

Figure 14:
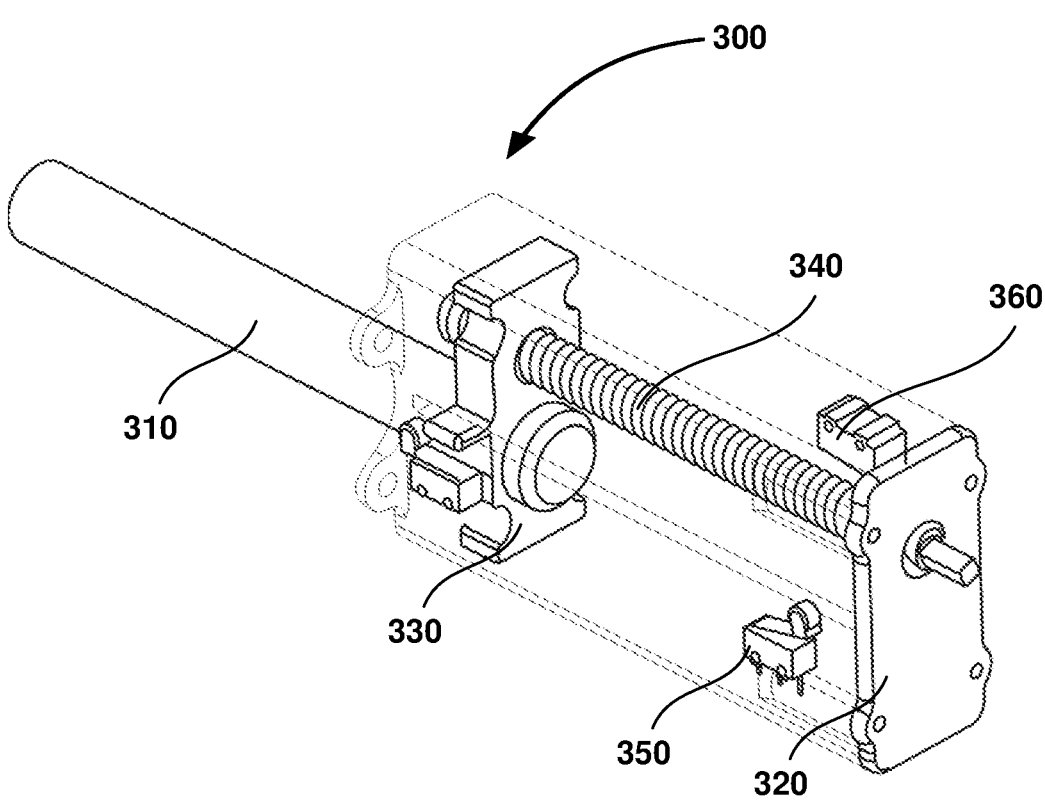
FIG. 14 illustrates a perspective view of a linchpin module of the automatic trailer hitch of FIGS. 1-8, according to an embodiment of the present invention.

Referring to FIGS. 1-8, the base module 10 comprises a block 20 configured to be connected to a hitch receiver (not shown in figures), wherein the hitch receiver is connected to at least one of: a towing vehicle (not shown in figures) and/or a towed vehicle (not shown in figures). The block 20 comprises a plurality of adjustment holes 24, wherein each adjustment hole 24 is dimensioned to receive a linchpin 310 (FIG. 14). The block 20 further comprises a plurality of connection holes 26 to facilitate connection of the base module 10 with the hitch receiver (not shown in figures). In an embodiment as seen in FIGS. 1-8, the block 20 is substantially L-shaped in design. However, it should be understood that the block 20 could have other shapes to suit the requirements of the user.

The base module 10 further comprises a carriage 30 that is permanently/removably connected to the block 20 using a suitable connection element 28 wherein the connection element 28 could include but not limited to: screw fasteners, welding, riveting, keyways, snap-fit coupling, and so on. In an embodiment as seen in FIGS. 1-8, the carriage 30 is substantially U-shaped. The carriage 30 comprises a plurality of gear tooth 32 disposed on the inner periphery of the carriage 30. The block 20 and the carriage 30 together collectively define the "fixed frame" of the automatic trailer hitch 100.

Figure 9:
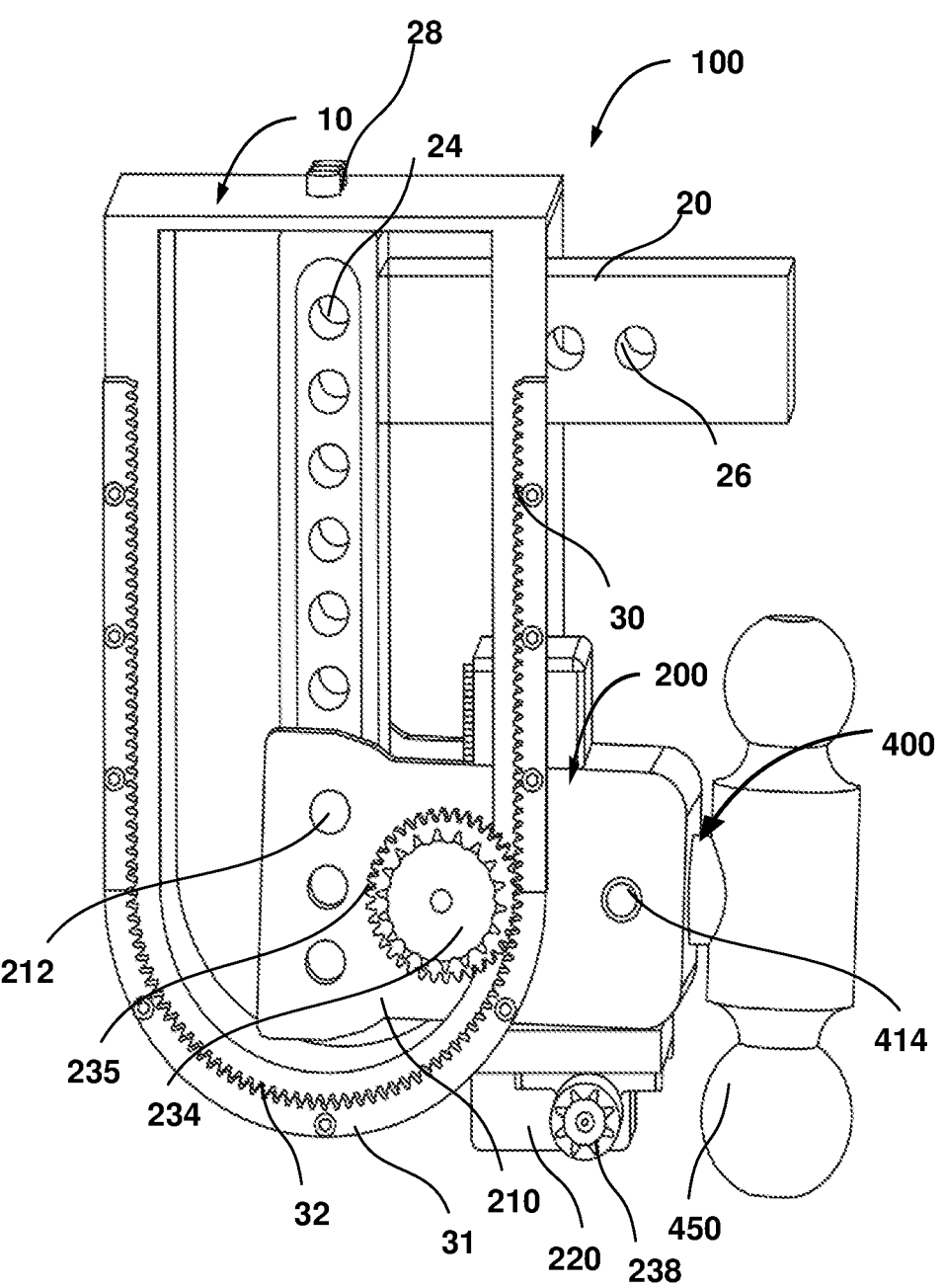
FIG. 9 illustrates a perspective view of an automatic trailer hitch of FIGS. 1-8 in a stowed position, according to an embodiment of the present invention.
Figure 13:
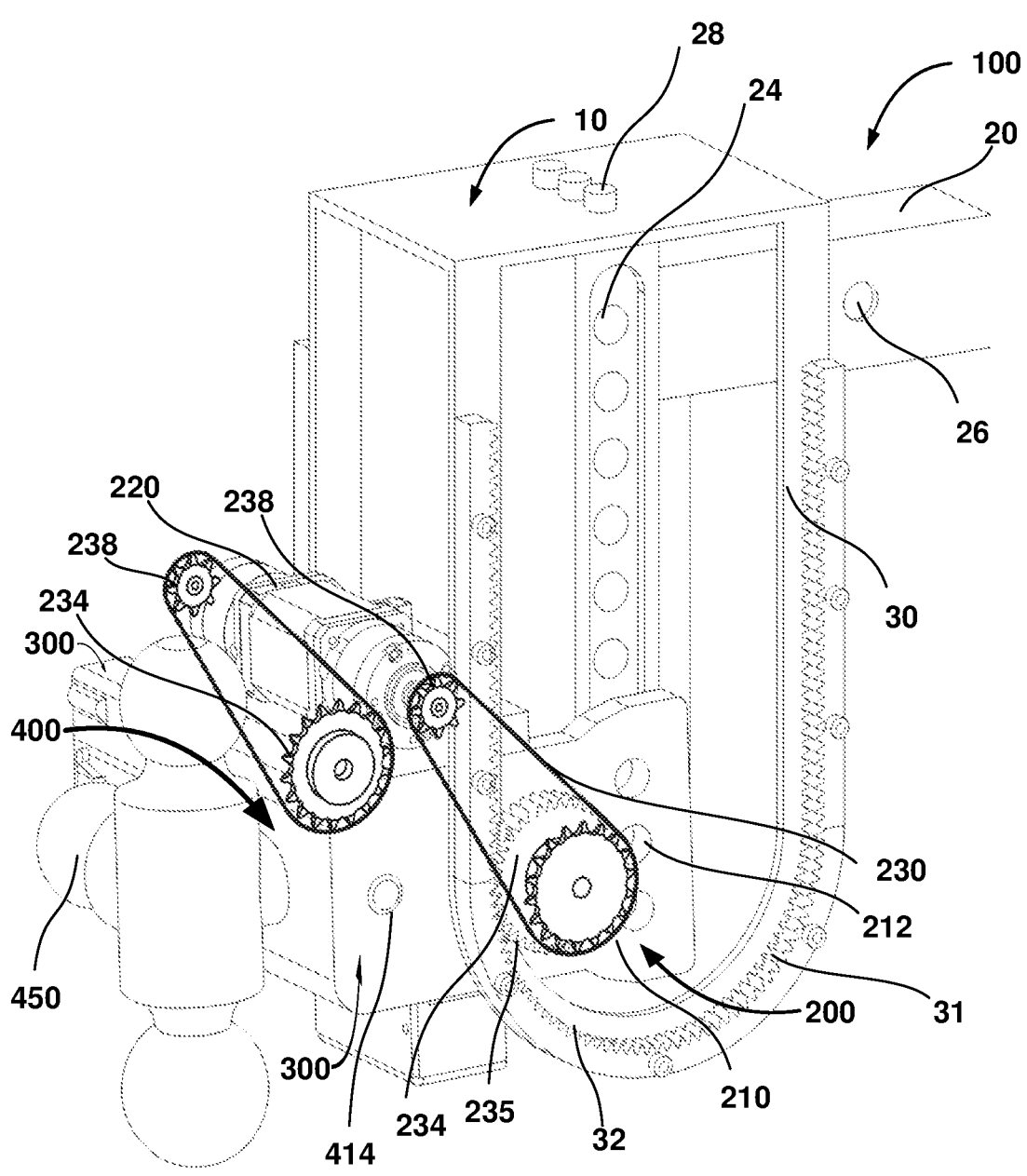
FIG. 13 illustrates a sectional perspective view of the automatic trailer hitch of FIGS. 1-8, wherein the mechanical linkage is in form of a chain and sprocket linkage, according an embodiment of the present invention.

Referring to FIGS. 1-8 and FIG. 13, the vertical climbing module 200 comprising a track 210, a motor 220, a pair of mechanical linkages 230 (FIG. 13), a pair of input gears 234 and a pair of output gears 238. The track 210 comprises a plurality of linchpin receiving holes 212 (FIG. 13). In an embodiment as seen in FIGS. 1-8, the motor 220 is a dual shaft (side) 360-degree control servomotor having two motor output shafts (not shown in figures). However, it should be understood that the motor 220 could also include a stepper motor. Each motor output shaft (not shown in figures) is connected to an output gear 238. The input gear 234 comprises a smaller gear and a larger gear joined in concentric relation to each other. The input gear 234 is rotatably connected to the track 210 through connection means such as but not limited to bearings, screws, and so on. The gear tooth 235 of the larger gear of the input gear 234 are meshingly engaged to the plurality of gear tooth 32 disposed on the inner periphery of the carriage 30. In other words, the gear tooth 235 of the input gear 234 can travel along the inner periphery of the U-shaped carriage 30 to thereby selectively bring the automatic trailer hitch 100 in the deployed position (FIGS. 1-8) and stowed position (FIG. 9). The mechanical linkage 230 further rotatably connects the output gear 238 and the input gear 234. As seen in FIG. 13, the mechanical linkage 230 (FIG. 13) is in the form of a chain and sprocket linkage. However, it should be understood that the mechanical linkage 230 could include other linkages such as but not limited to: intermediate gear linkage, rope and pulley linkage, belt and pulley linkage, and so on.

Further, in an embodiment as seen in FIGS. 1-8, the track 210 has a two-part structure wherein a U-shaped gear rack is connected to a U-shaped metal frame to define the overall two-piece structure of the track 210. However, it should be understood that the track 210 can have a one-piece structure wherein a U-shaped gear rack is integrally formed with a U-shaped metal frame (during manufacturing) to define the overall single-piece structure of the track 210.

The motor 220 is rotatably coupled to the track 210 through the mechanical linkage 230, the output gear 238, and the input gear 234. Rotation of the motor 220 enables the input gear 234 to rotate against the plurality of gear tooth 32 disposed on the inner periphery of the carriage 30, thereby enabling vertical climbing and lowering of the track 210 relative to the carriage 30. Thus, the vertical climbing module 200 is configured to vertically adjust the hitch(s) 450 along a single axis. The motor 220 further comprises an inbuilt potentiometer (not shown in figures) that is configured to act as a motion sensing mechanism that will be described in greater detail in the below description. In an embodiment, the motion sensing mechanism further includes an optical rotary encoder (not shown in figures) that is configured to sense movement of at least one of the: output gear 238 and/or the input gear 234. The optical rotary encoder (not shown in figures) is already known in the prior art and is sold by various merchandise using various product names such as but not limited to: "Signswise Incremental Optical Rotary Encoder for Arduino 600P/R Wide Voltage Power Supply DC 5-24V 6 mm Shaft Quadrature" and so on. In another embodiment, the motion sensing mechanism could include other sensors such as LASER sensors, displacement sensor, strain gauge and so on.

In an exemplary embodiment, the gear assembly of the input gear 234 and the output gear 238 is maintained at a 1:2 gear ratio. The optical rotary encoder (not shown in figures) continuously generates a bit stream while the track 210 is moving through its trajectory defined by the inner periphery of the carriage 30. This data can be stored in the register memory of a microprocessor of the controller module 500 such as but not limited to: Adafruit Metro 2.0, that has non-volatile memory (8-bit & 16-bit Pulse-width modulation) capable of storing the last known positions in case of sudden power loss and data retrieval on restart.

FIG. 9 illustrates a perspective view of an automatic trailer hitch 100 in a stowed position, according to an embodiment of the present invention. The motor 220 could be further rotated to move the track 210 downwards relative to the carriage 30 and then, the track 210 could move further relative to the carriage 30 and the input gear 234 could rotate against the plurality of gear tooth 32 disposed on a U-shaped portion 31 of the inner periphery of the carriage 30, thereby bringing the automatic trailer hitch 100 in an opposite stowed position as seen in FIG. 9. As seen in FIG. 9, the automatic trailer hitch 100 is positioned to not allow removable coupling between a towing vehicle (not shown in figures) and a towed vehicle (not shown in figures) to prevent damage and theft of the hitch(s) 450 while ensuring ease of use in accessing the trunk of the towing vehicle (not shown in figures).

Figure 10:
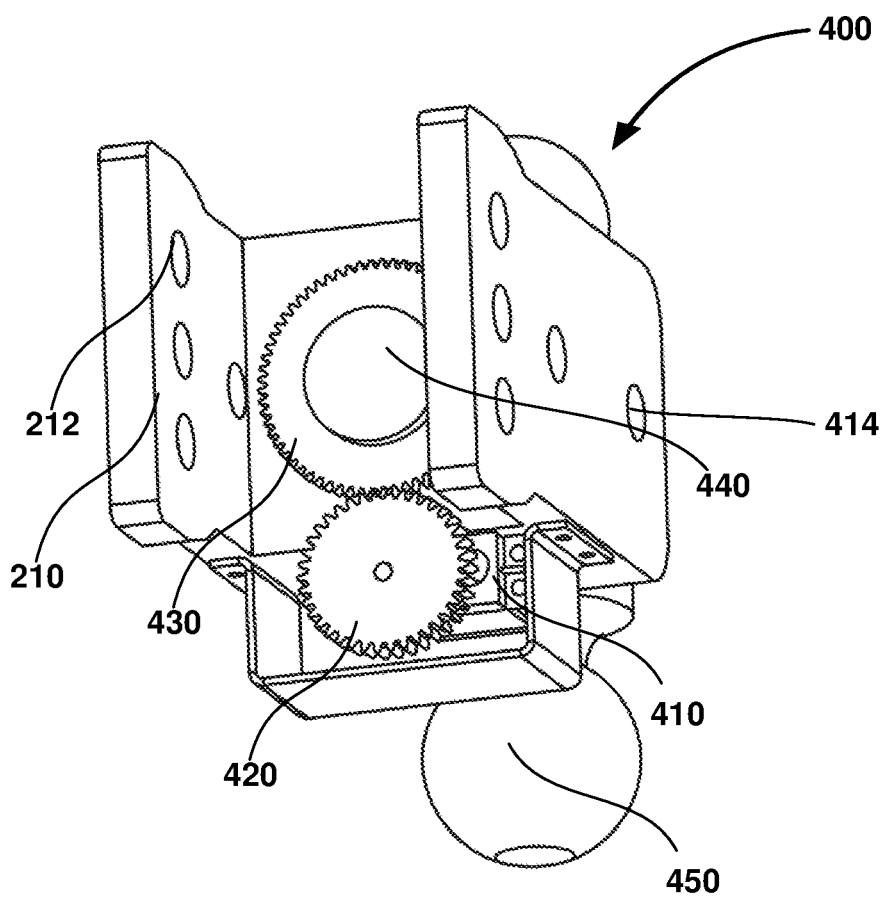
FIG. 10 illustrates a first-perspective view of a rotation module of the automatic trailer hitch of FIGS. 1-8, according to an embodiment of the present invention.
Figure 11:
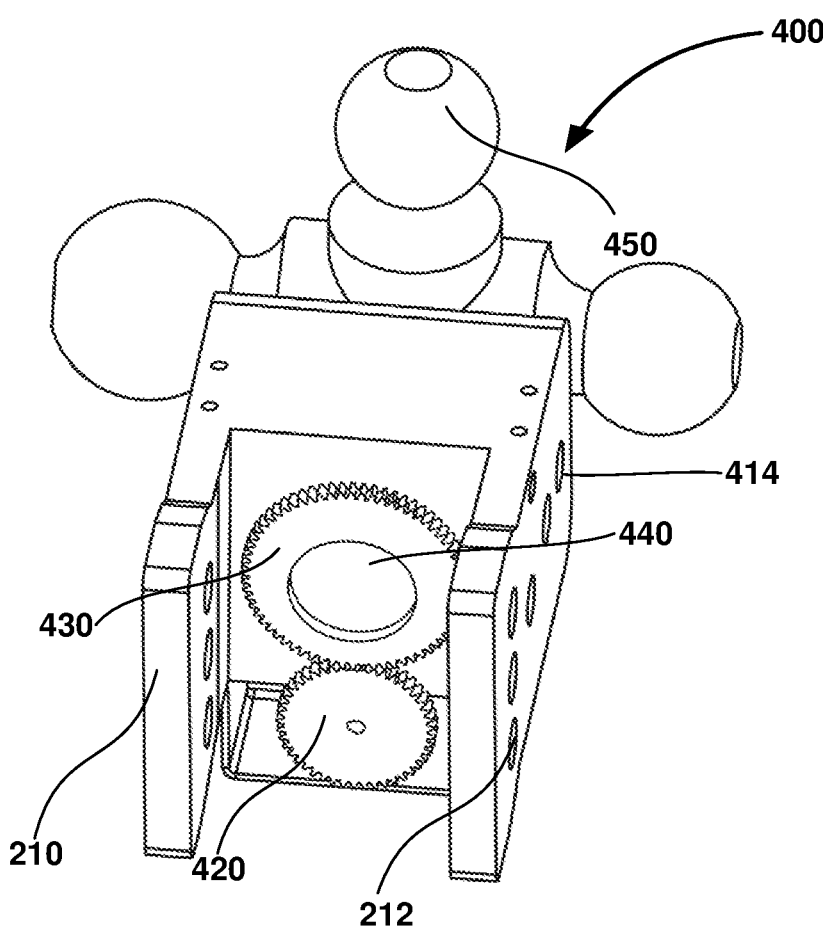
FIG. 11 illustrates a second perspective view of a rotation module of the automatic trailer hitch of FIGS. 1-8, according to an embodiment of the present invention.
Figure 12:
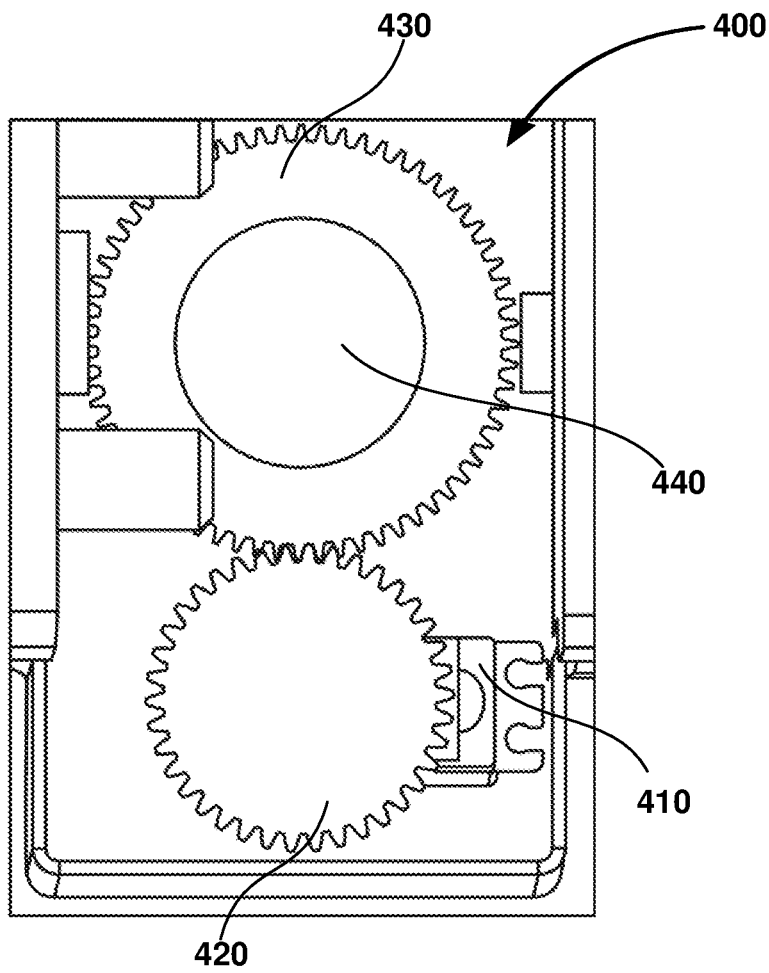
FIG. 12 illustrates a front view of the rotation module of FIG. 10, according to an embodiment of the present invention.

FIGS. 10-12 illustrates a first perspective view, a second perspective view and a front view of the rotation module 400 respectively, according to an embodiment of the present invention. The rotation module 400 comprises a rotation motor 410, a retainer gear 420 coupled to a rotation motor shaft (not shown in figures), and an output gear 430 coupled with a shaft 440, and at least one hitch 450 connected to the shaft 440. The rotation module 400 is configured to rotate the hitch(s) 450 along a single axis. The rotation motor 410 includes at least one of: a 360-degree control servomotor and/or a stepper motor. The rotation module 400 further comprises at least one rotation adjustment hole 414 to receive a linchpin 310 (FIG. 14). As seen in FIGS. 1-8 and FIGS. 10-12, the hitch(s) 450 is a tri-ball hitch. However, it should be understood that the hitch(s) 450 could also include but not limited to: single ball hitch, double ball hitch, pintle hitch, gooseneck hitch, boom hitch, receiver hitch, hook type hitch, lunette ring hitch and Janney couplers. The rotation motor 410 further comprises a potentiometer that is configured to act as a motion-sensing mechanism of the rotation module 400 which will be described in greater detail in below description.

Figure 15:
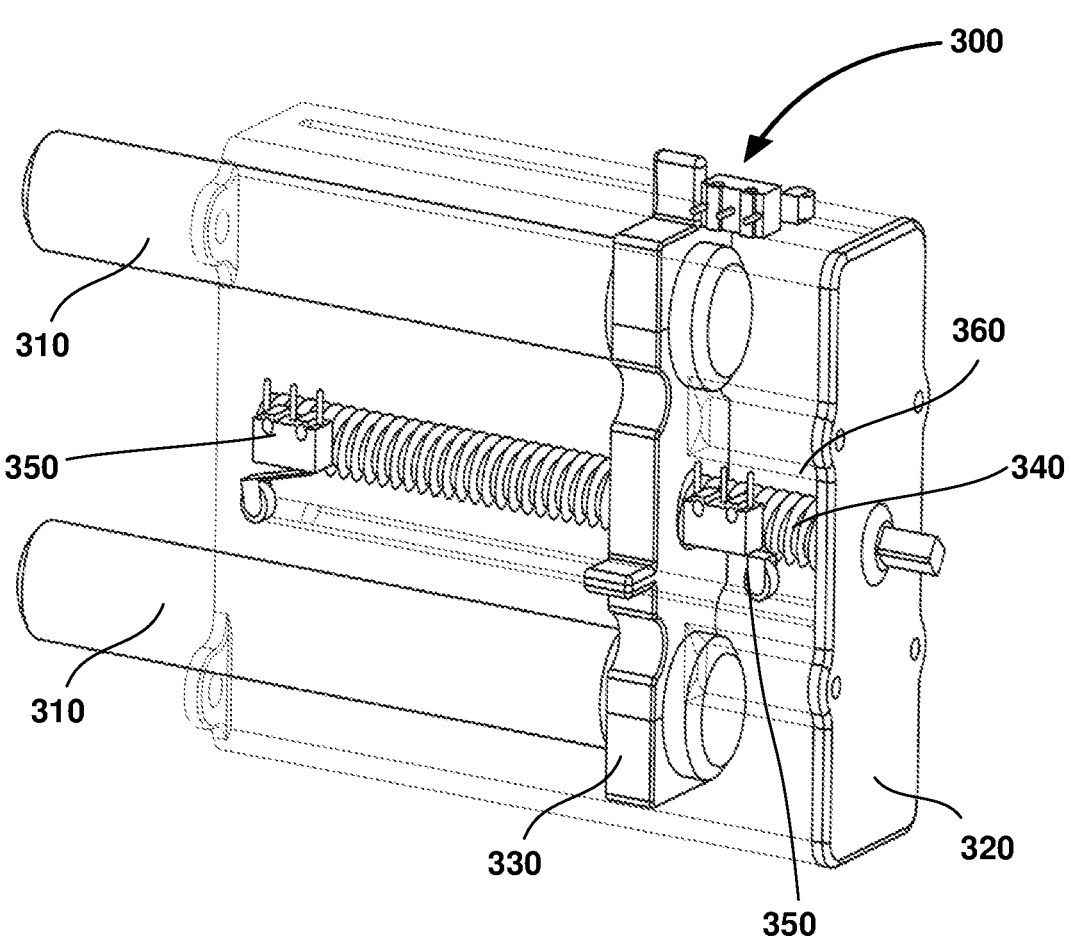
FIG. 15 illustrates a perspective view of a linchpin module of the automatic trailer hitch of FIGS. 1-8, according to yet another embodiment of the present invention.

FIG. 14 illustrates a perspective view of a linchpin module 300 of the automatic trailer hitch. The linchpin module 300 is configured for selectively driving the linchpins 310 in an engaged position and a disengaged position. The linchpin module 300 is responsible for inserting and extracting the linchpins 310 once the corresponding holes of the base module 10, the vertical climbing module 200, and/or rotation module 400 are aligned at the desired position. As seen in FIGS. 1-8, the automatic trailer hitch 100 comprises two linchpin modules 300, wherein one linchpin module 300 is configured for engaging and/or disengaging linchpins 310 relative (inside and/or outside) to the adjustment holes 24 of the block 20, and the other remaining linchpin module 300 is configured for engaging and/or disengaging linchpin 310 relative (inside and/or outside) to the rotation adjustment hole 414 of the rotation module 400. Again, referring to FIG. 14, the linchpin module 300 comprises a brace plate 320, and a nut plate 330 actuated by a rotating lead screw 340, that is driven by a driving motor 360 (not shown in figures). The nut plate 330 further includes a linchpin 310. In another embodiment, as seen in FIG. 15, the nut plate 330 further includes two linchpins 310. As seen in FIGS. 14-15, the motion sensing mechanism of the linchpin module 300 comprises a plurality of terminal roller-actuated micro-switches 350, wherein the motion sensing mechanism of the linchpin module 300 will be later described in greater detail in the below description.

As described earlier with reference to FIGS. 1-14, each of the vertical climbing module 200, the plurality of linchpin modules 300, and the rotation module 400 comprises a motion sensing mechanism. The potentiometer of the motor 220, as well as the optical rotary encoder (not shown in figures), acts as the motion-sensing mechanism for the vertical climbing module 200, the plurality of terminal roller-actuated micro-switches 350 acts as the motion-sensing mechanism for the linchpin module 300 and the potentiometer of the rotation motor 410 acts as the motion sensing mechanism for the rotation module 400.

Figure 16:
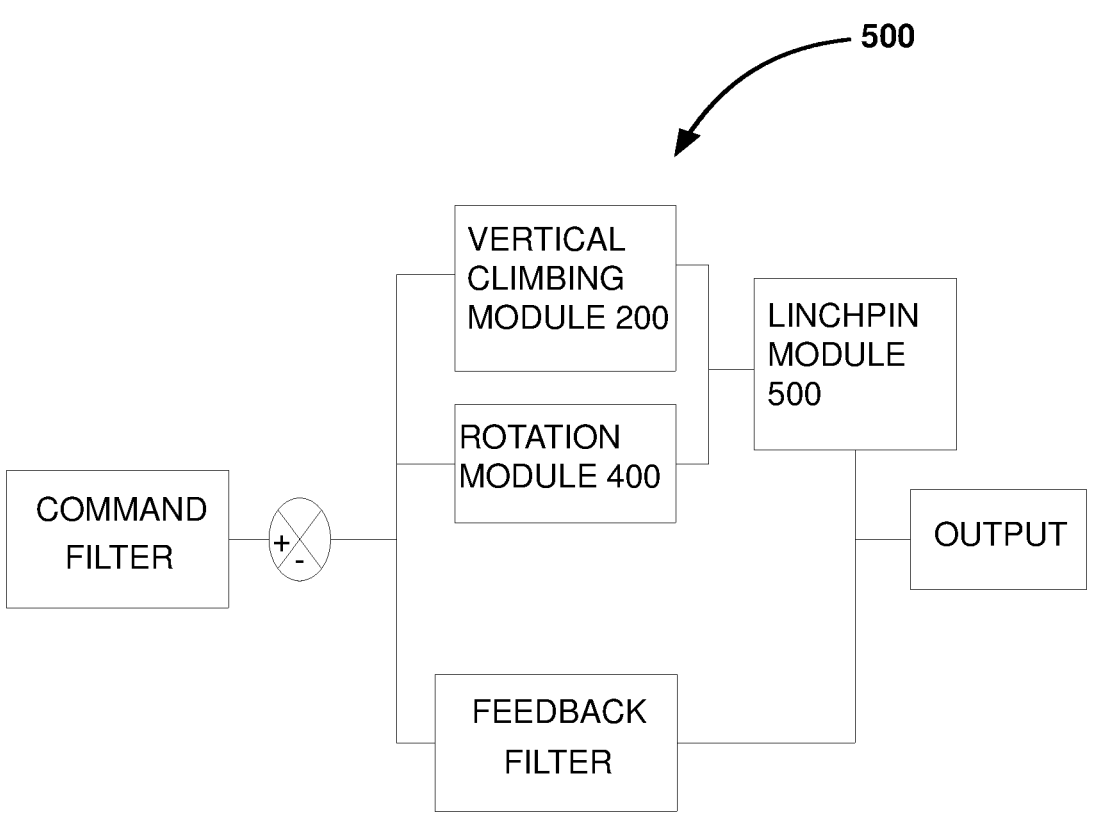
FIG. 16 illustrates a schematic block diagram of the controller module of the automatic trailer hitch of FIGS. 1-8, according to an embodiment of the present invention.

Referring to FIG. 16, a controller module 500 is configured to receive the user input using a user interface 510 (not shown in figures); wherein the controller module 500 is operatively coupled to the motion sensing mechanism of each of the vertical climbing module 200, the plurality of linchpin modules 300 and the rotation module 400 to thereby monitor and control the multiple-axis position adjustment of the hitch(s) 450 of the automatic trailer hitch 100. The user interface 510 (not shown in figures) of the controller module 500 includes at least one of: touchscreen interface, joystick interface, remote, keyboard interface, switch interface and button interface. In an embodiment, the controller module 500 further comprises a camera 510 (not shown in figures) to visually assist the user in enabling coupling between a towing vehicle (not shown in figures) and a towed vehicle (not shown in figures). In another embodiment, the controller module 500 comprises a plurality of adjustable clips to enable connection between the user interface 510 (not shown in figures) and an installation surface of the controller module 500. The controller module 500 further comprises a communication bus configured for data transfer between the controller module 500 and the motion sensing mechanism of each of the vertical climbing module 200, the plurality of linchpin modules 300, and the rotation module 400, wherein the communication bus transmits data through a communication interface comprising at least one of the: wired data cable connection, Bluetooth, internet, wireless local-area network WLAN and radio communication. The controller module 500 further comprises a microprocessor having memory that is capable of storing data in case of sudden power loss and retrieves data on restart.

The controller module 500 is the prime interface for the user to interact with the automatic trailer hitch 100. The controller module 500 can be placed firmly in an ergonomic cluster while used from inside the vehicle and allows mobility. The controller module 500 is made of a material having sufficient strength to respond to various weather conditions and ingress protection.

The controller module 500 is configured to selectively position the hitch(s) 450 of the automatic trailer hitch 100 in a deployed position and a stowed position; wherein in the deployed position, the automatic trailer hitch 100 is positioned to allow removable coupling between a towing vehicle (not shown in figures) and a towed vehicle (not shown in figures); and wherein in the stowed position, the automatic trailer hitch 100 is positioned to not allow removable coupling between a towing vehicle and a towed vehicle to prevent damage and theft of the hitch(s) 450 while ensuring ease of use in accessing the trunk of the towing vehicle (not shown in figures).

Referring to FIG. 16, an exemplary control logic (block diagram) of the controller module 500 of the automatic trailer hitch 100 will now be described. The user can provide their input using the user interface 510 (not shown in figures) in the "command filter". Accordingly, the controller module 500 selectively operates at least one of the: vertical climbing module 200 and/or the rotation module 400 by actuating the corresponding motors. Afterward, the controller module 500 operates at least one linchpin module 300 by actuating the corresponding motor. Further, the controller module 500 is operatively coupled to the motion sensing mechanism of each of the vertical climbing modules 200, the plurality of linchpin modules 300, and the rotation module 400. The motion sensing mechanism of each of the vertical climbing module 200, the plurality of linchpin modules 300, and the rotation module 400 senses the actual position of the corresponding module and the error (difference) between the desired position and the actual position. The controller module 500 further senses feedback ("feedback filter") from the user by using the user interface 510 (not shown in figures). Depending on the sensed feedback and/or error, the controller module 500 selectively operates at least one of the: the vertical climbing module 200, the plurality of linchpin modules 300, and the rotation module 400 to obtain the desired output.

Figure 17:
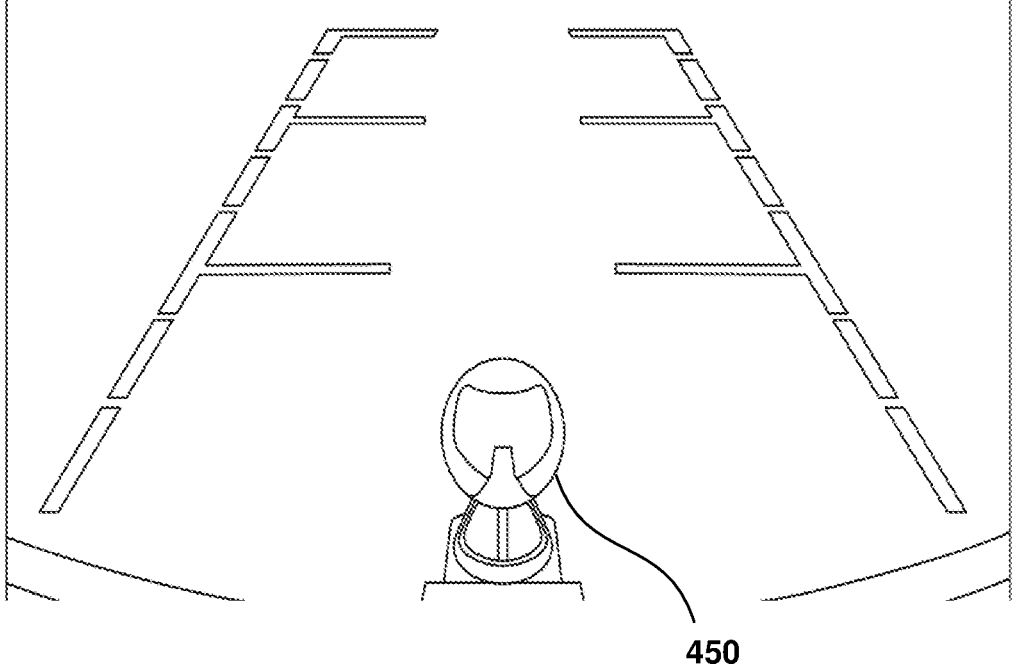
FIG. 17 and FIG. 18 illustrate various exemplary camera views of a controller module of the automatic trailer hitch of FIGS. 1-8, when the towed vehicle is being coupled to the towing vehicle using the automatic trailer hitch of FIGS. 1-8.
Figure 18:
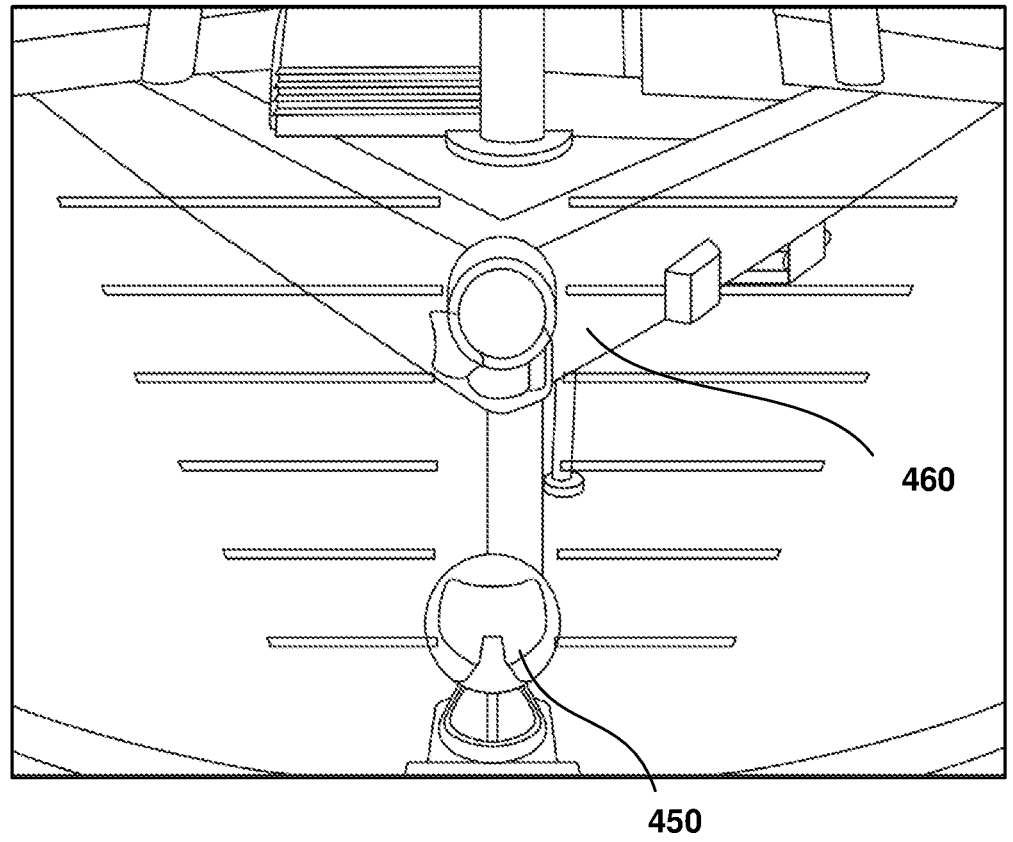

FIG. 17 and FIG. 18 illustrate various exemplary camera views of a controller module 500 when the towed vehicle (not shown in figures) is being coupled to the towing vehicle (not shown in figures) using the automatic trailer hitch of FIGS. 1-8. The user can visually see the coupling process using a display screen 520 (not shown in figures) of the controller module 500 and thereby provide command inputs using the user interface 510 (not shown in figures) to ensure coupling is done effectively. The controller module 500 comprises algorithms that guide the user during the coupling process. The algorithms are processed by the controller module 500 and driver assist indicators are displayed (blinked/flashed) on the display screen 520 (not shown in figures) such that user can effectively reverse their vehicle using assistance from the flashing (blinking) driver assist indicators. As seen in FIG. 17, the screen indicator is in the form of a rectangular box (map) such that user can reverse their vehicle in such a manner that the to-be-coupled vehicle such as but not limited to a trailer, falls inside the rectangular box (map) displayed on the display screen 520 (not shown in figures) as to assist in achieving an effective coupling between the user vehicle and the to-be-coupled vehicle. As seen in FIG. 18, the screen indicator is in the form of a triangular wave (antenna-like wave) such that the user can position their hitch 450 in such a manner that the corresponding hitch connector 460 of the to-be-coupled vehicle lies midway between the triangular wave (antenna like wave) displayed on the display screen 520 (not shown in figures) as to enable an effective hitch coupling between the user vehicle and the to-be-coupled vehicle.

The various components and parts of the various embodiments of the automatic trailer hitch 100 of the present invention are similar and interchangeable. It is obvious to the one skilled in the art that the various components, and parts of the automatic trailer hitch 100 of one embodiment of the present invention could be considered for other embodiments with little or no variation.

The automatic trailer hitch 100 of the present invention according to FIGS. 1-18 comprises a pair of input gears 234 and a pair of output gears 238. However, it should be understood that the automatic trailer hitch 100 could effectively function with a single input gear 234 and a single output gear 238 with little to no variation in functionality. The automatic trailer hitch 100 of the present invention according to FIGS. 1-18 is primarily intended for road vehicles. However, it should be understood that the automatic trailer hitch 100 could be useful for coupling any other component such as but not limited to: planes, rail vehicles, and so on.

It should be understood according to the preceding description of the present invention that the same is susceptible to changes, modifications and adaptations, and that the said changes, modifications and adaptations fall within scope of the appended claims.

What is claimed is:

1. An automatic trailer hitch (100) for enabling removable coupling between a towing vehicle and a towed vehicle, comprising:

a base module (10) comprising a block (20) configured to be connected to a hitch receiver, wherein the block (20) comprises a plurality of adjustment holes (24) and the base module (10) comprises a carriage (30) connected to the block (20), and wherein the carriage (30) comprises a plurality of gear tooth (32);

a vertical climbing module (200) comprising a track (210), a motor (220), a mechanical linkage (230), at least one input gear (234) and at least one output gear (238);

a plurality of linchpin modules (300) configured for selectively driving the linchpins (310) in an engaged position and a disengaged position;

a rotation module (400) comprising a rotation motor (410), a retainer gear (420) coupled to a rotation motor shaft, an output gear (430) coupled with a shaft (440), and at least one hitch (450) connected to the shaft (440); and wherein the rotation module (400) is configured to rotate the hitch(s) (450) along a single axis;

wherein each of the vertical climbing module (200), the plurality of linchpin modules (300), and the rotation module (400) comprises a motion-sensing mechanism; and a controller module (500) configured to receive the user input using a user interface (510); wherein the controller module (500) is operatively coupled to the motion sensing mechanism of each of the vertical climbing module (200), the plurality of linchpin modules (300) and the rotation module (400) to monitor and control the multiple-axis position adjustment of the hitch(s) (450) of the automatic trailer hitch (100).

2. The automatic trailer hitch (100) according to claim 1, wherein the block (20) is substantially L-shaped.

3. The automatic trailer hitch (100) according to claim 1, wherein the hitch receiver is connected to at least one of: a towing vehicle and/or a towed vehicle.

4. The automatic trailer hitch (100) according to claim 1, wherein the carriage (30) is substantially U-shaped.

5. The automatic trailer hitch (100) according to claim 1, wherein the motion-sensing mechanism includes an optical rotary encoder that is configured to sense movement of at least one of: the output gear (238) and/or the input gear (234).

6. The automatic trailer hitch (100) according to claim 1, wherein the vertical climbing module (200) is configured to vertically adjust the hitch(s) (450) along a single axis.

7. The automatic trailer hitch (100) according to claim 1, wherein the vertical climbing module (200) further comprises a plurality of bearings and screws.

8. The automatic trailer hitch (100) according to claim 1, wherein the motor (220) includes at least one of: a servo-motor and a stepper motor.

9. The automatic trailer hitch (100) according to claim 1, wherein the motor (220) further comprises a potentiometer that is configured to act as a motion sensing mechanism of the vertical climbing module (200).

10. The automatic trailer hitch (100) according to claim 1, wherein the mechanical linkage (230) includes at least one of: chain and sprocket linkage, gear linkage, rope and pulley linkage, and belt and pulley linkage.

11. The automatic trailer hitch (100) according to claim 1, wherein the linchpin module (300) comprises a brace plate (320) and a nut plate (330) actuated by a rotating lead screw (340) and a driving motor (360).

12. The automatic trailer hitch (100) according to claim 1, wherein the motion sensing mechanism of the linchpin module (300) comprises a plurality of terminal roller-actuated micro-switches (350).

13. The automatic trailer hitch (100) according to claim 1, wherein the rotation motor (410) includes at least one of: a servomotor and/or a stepper motor.

14. The automatic trailer hitch (100) according to claim 1, wherein the rotation motor (410) further comprises a potentiometer that is configured to act as a motion sensing mechanism of the rotation module (400).

15. The automatic trailer hitch (100) according to claim 1, wherein the hitch(s) (450) is selected from a group of hitches comprising of: ball hitch, pintle hitch, gooseneck hitch, boom hitch, receiver hitch, hook type hitch, lunette ring hitch, and Janney couplers.

16. The automatic trailer hitch (100) according to claim 1, wherein the user interface (510) of the controller module (500) includes at least one of: touchscreen interface, joystick interface, remote, keyboard interface, switch interface, and button interface.

17. The automatic trailer hitch (100) according to claim 1, wherein the controller module (500) further comprises a camera (510) to visually assist the user in enabling coupling between a towing vehicle and a towed vehicle.

18. The automatic trailer hitch (100) according to claim 1, wherein the controller module (500) comprises a plurality of adjustable clips to enable connection between the user interface (510) and an installation surface of the controller module (500).

19. The automatic trailer hitch (100) according to claim 1, wherein the controller module (500) further comprises a communication bus configured for data transfer between the controller module (500) and the sensing mechanism of each of the vertical climbing module (200), the plurality of linchpin modules (300) and the rotation module (400), wherein the communication bus transmits data through a communication interface comprising at least one of the: wired (data cable) connection, Bluetooth, internet, wireless local-area network (WLAN) and radio communication.

20. The automatic trailer hitch (100) according to claim 1, wherein the controller module (500) further comprises a microprocessor having a memory that is capable of storing data in case of sudden power loss and retrieves data on restart.

21. The automatic trailer hitch (100) according to claim 1, wherein the controller module (500) is configured to selectively position the hitch(s) (450) of the automatic trailer hitch (100) in a deployed position and a stowed position; and wherein in the deployed position, the automatic trailer hitch (100) is positioned to allow removable coupling between a towing vehicle and a towed vehicle; and wherein in the stowed position, the automatic trailer hitch (100) is positioned to not allow removable coupling between a towing vehicle and a towed vehicle to prevent damage and theft of the hitch(s) (450) while ensuring ease of use in accessing the trunk of the towing vehicle.

* * * * *